Patented July 3, 1951

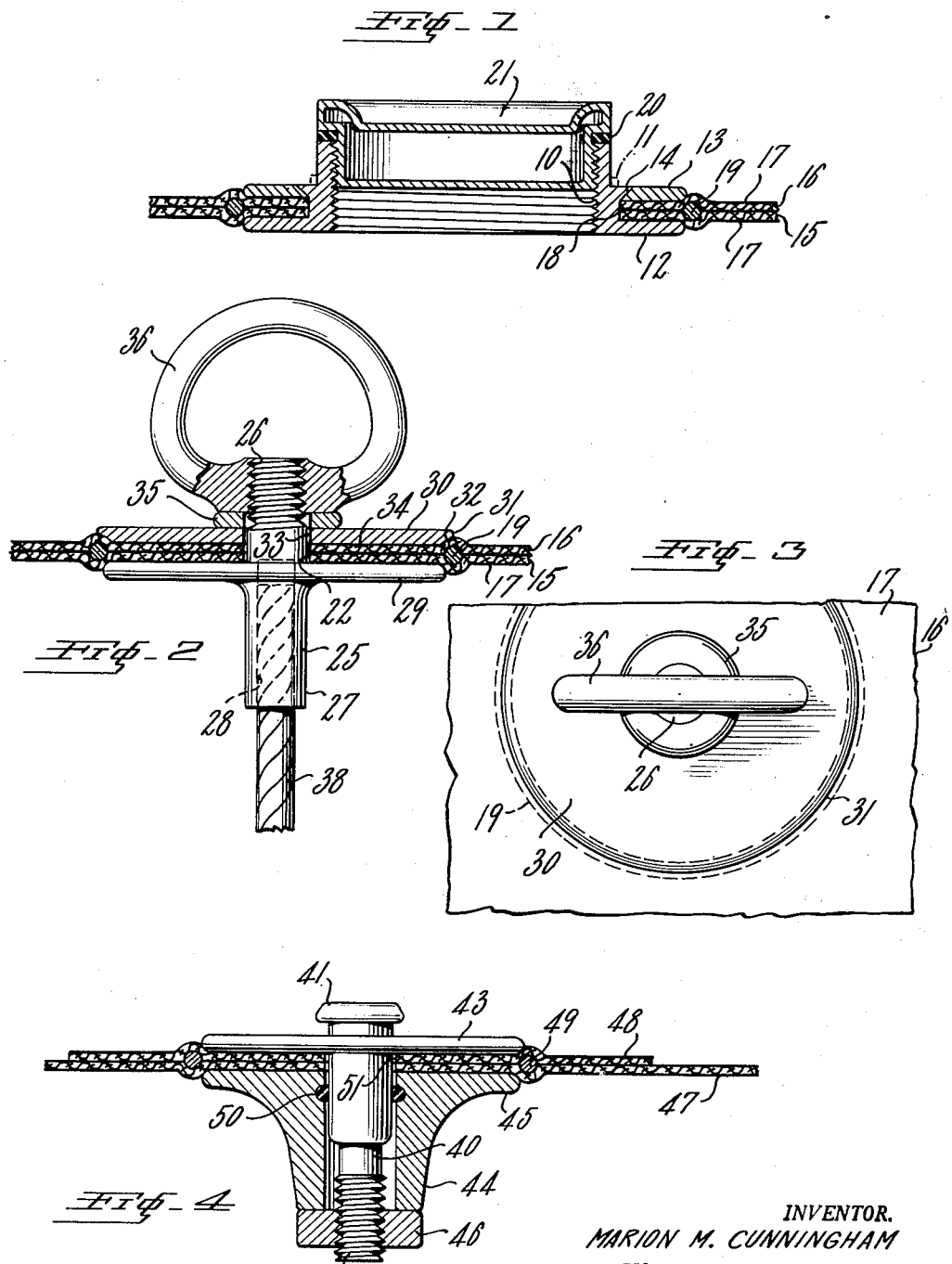

2,559,064

UNITED STATES PATENT OFFICE 2,559,064

FITTING FOR FLEXIBLE CONTAINERS

Marion Morgan Cunningham, Woonsocket, R. I., assignor to United States Rubber Company, New York, N. Y., a corporation of New Jersey Application August 18, 1949, Serial No. 111,052

6 Claims. (Cl. 150—8)

This invention relates to fittings for non-metallic flexible containers such as reinforced rubber liquid containers, and more particularly to a compression fitting having novel means for strengthening the flexible container wall adjacent the fitting and for reducing the likelihood of the fitting developing a leak.

The fitting of the present invention may be constructed to provide inlets, outlets, attachments for lifting, attachments for securing the container to a support, and other services.

Compression fittings of this type have been used for some time at openings in a tank or container, particularly on bladder type fuel containers for aircraft and flexible walled liquid storage containers. These containers are usually made from fabric coated with rubber or plastic compositions which render the material impervious to the contents of the container. Under certain conditions of use the stress on the container wall is concentrated at the fitting which tends to disturb the compression seal against the wall about an opening therein and cause leakage.

It is an object of this invention to provide a fitting construction which will withstand severe stresses without permitting the contents of the container to leak out through the opening in the container wall. Another object is to confine the compressed marginal wall to prevent the coating composition from flowing out from between the clamping flanges of the fitting.

In accordance with the fitting construction embodying the present invention a rigid ring of substantially round cross-section is embedded in the wall of the container concentrically with the opening therein. The flanges of the fitting are sufficiently large in diameter to bear against the rigid ring but not so large that the ring prevents the flanges from compressing the marginal wall of the container lying within the confines of the ring. In other words, the flange must be of a size and shape capable of fitting down into the ring without passing completely through it. If the container wall is relatively thick with respect to the ring, the flanges may be spaced relatively far apart and still compress the wall sufficiently to effect a seal. In such case the outside diameter of one flange is not critical, since the other flange of critical size will project into the marginal wall space sufficiently to seal against leakage. By holding the relative dimensions of the flanges and ring within these limits, any load on the fitting will be taken up evenly by the rigid insert ring without in any way disturbing the seal between the inner surface of the container wall and the outer surface of the inner flange. Considerable strength is added to the fitting assembly by clamping the fitting over the ring, and adequate strength may be obtained by using a fitting having flanges smaller in diameter than those used previously.

The plastic or rubber coating applied to the fabric to produce the container wall is subject to cold flow under pressure. Therefore, when the container wall is sandwiched between the fitting flanges and compressed, there is a tendency for the coating to flow off the fabric and out from between the flanges. This, of course, reduces the pressure and increases the danger of leakage. By employing an insert ring having an inside diameter approximately equal to the diameter of the flanges, the plastic coating is substantially confined within the space bounded by the two flanges, the neck of the fitting projecting through the opening in the container wall, and the insert ring. The opportunity for the plastic coating to flow out from between the flanges is substantially reduced by this construction.

The above and other objects of the present invention will be further understood from the following description when read in connection with the accompanying drawing showing different embodiments of the invention.

In the drawing:

Fig. 1 is a cross-sectional view of a combination filler and drain fitting installed in a wall of a flexible container;

Fig. 2 is a cross-sectional view of a different fitting used to anchor a tie cable to the container wall;

Fig. 3 is a plan view of the fitting illustrated in Fig. 2; and

Fig. 4 is a cross-sectional view of a third fitting comprising a button-type hanger fitting.

The fitting illustrated in Fig. 1 is a filler and drain fitting very similar to the well-known bung used in barrels and drums. It is attached to the marginal edge of container wall 15 surrounding opening 18 cut therein. The wall 15 is shown as comprising two plies of fabric 16 coated on both sides with rubber or synthetic rubber 17. The fitting has an internally threaded neck 10 which projects through a wall opening 18, and an outer flange 13. This neck has secured thereto the inner flange 12. As used in the specification the term "inner" refers to the side nearest the inside of the container. A cap 21 screws into the threaded neck 10 and seals on the gasket 20. The outer flange 13 is a separable flat ring having a beveled inside edge 14 and it is large enough in diameter to slip freely over the shoulder 11 of the fitting neck 10. It is placed in position with this beveled edge 14 facing upwardly. A special tool, not shown, is used to deform the shoulder 11 from its original shape, indicated by dotted lines, to its final shape in crimped position over the beveled edge 14 of flange 13. In this manner the marginal edge of the coated fabric wall 15 is compressed between the flanges 12 and 13 to seal off the liquid contents of the container and prevent them from escaping through the opening 18. A round metal insert ring 19 is embedded between the two plies of rubber coated fabric comprising the container wall 15 concentrically with the opening 18. To insure a good bond between the ring 19 and the rubber coating 17, it is preferred that an appropriate rubber cement be used. Such rubber-to-metal bonding adhesives are commonly known in the art.

The outside diameter of the flanges 12 and 13 preferably are slightly greater than the inside diameter of ring 19 but less than the inside diameter of the ring increased by half the thickness thereof. This ratio of ring diameter to flange diameter permits the flanges to move toward each other to compress the wall 15 within the confines of the ring 19 without undue interference from the ring. To further facilitate the movement of flanges 12 and 13 down into the ring, the circumferential edges of the flanges are rounded. Yet the opening of ring 19 is small enough so that the flanges cannot pass through the ring. Consequently, the flanges bear on the ring as well as on the wall 15 and any load imposed on the fitting is transmitted to the ring.

The space enclosed by the outside surface of the neck 10, the inner side of flange 13, the inner face of the flange 12, and the insert ring 19 confines the rubber coating and prevents any substantial squeezing out of the rubber from between the flanges when pressure is applied. If no provision is made to restrict the cold flow of the rubber, the pressure may cause cold flow to the extent that liquid will leak out if the fitting is disturbed.

Another example of my invention is illustrated in Figs. 2 and 3. This fitting is used to anchor a tie cable and a lifting eye to the flexible body of a barrel or container made from flexible rubber coated fabric. The wall 15 of the container is made from two plies of rubber coated fabric. The fitting comprises a shank or body portion 25 having an integral flange 29 and a separable flange 30, and an eye 36. The shank 25 of the fitting projects axially through the opening 22 of the container wall. Inner flange 29 is integral with the body portion 25 of the fitting. The outer flange 30 is a separate flat ring having a central opening 33 slightly larger than the fitting shank 25 and a rather heavy lip 31 extending from its outer periphery on one face only. The lip is produced by cutting a radial groove 32 along the circumferential edge of the flange. Groove 32 corresponds in contour to the cross-sectional contour of the insert ring 19. When the flange 30 is in position over the insert ring 19, the lip 31 lies above ring 19 separated therefrom by the thickness of one ply of the container wall 15. The flat bottom portion 34 of the flange 30 projects down into the space enclosed by the ring, bearing against the marginal edge of the wall 15 surrounding opening 22. Lock washer 35 is placed over the end of shank 25 and lies against the flange 30. A heavy metal ring or eye 36 having a radially tapped hole is screwed onto the threaded end 26 of shank 25. Tightening the eye 36 brings flanges 29 and 30 together and compresses the marginal edge of the container wall 15 which is sandwiched therebetween to form a fluid-tight seal between the rubber lining 17 of the container and the flat outer surface of the flange 29. The shank portion 25 of the fitting has an extension 27 which projects into the interior of the container. This end is bored out to form the hollow opening 28. A tie cable 38 is inserted into the hollow opening 28 and is securely attached to the fitting by means of a standard sweating or swaging operation.

In this modification of my invention the distance which the flange 30 may be moved downwardly into the ring opening is limited by the lip 31 which bears over the top of the ring 19. But this limitation does not prevent pressure from being brought to bear upon the marginal wall between the flanges 29 and 30, because of the construction of flange 30. Flange 30 has two diameters, that of the compressing surface 34 which excludes the lip 31, and that of the outer surface which includes the lip 31. The compressing surface 34 being of smaller diameter than the ring 19, projects down into the space within the ring, to compress the marginal wall against the inner flange 29. In alternative form flange 29 might be replaced with a flange having a lip, identical in construction to flange 30, with equally satisfactory performance.

The fitting shown in Figs. 2 and 3 may be used to lift the container by hooking into the eye 36. The load is taken up by cable 38 and transmitted through the cable to another fitting of the same kind in the opposite wall of the container.

A further modification of the invention is illustrated in Fig. 4 which shows a button-type snap hanger fitting frequently used in bladder type fuel cells for fastening the cells to an exterior supporting structure. The button cooperates with a complementary securing means, usually a mating keyhole opening in the supporting structure. This fitting comprises a pin 40 having an integral external flange 43 and a separable sleeve 44 having a flange 45. The sleeve 44 slips over the threaded end 42 of the pin 40 and its flange 45 cooperates with the flange 43 to compress the marginal edge of the container wall 47 through which the pin projects. Since the container wall 47, as shown, is made from single ply coated fabric, a collar 48 of the same material must be cemented to the wall 47 in order to anchor the ring 49 securely thereto. The button 41 comprises part of the pin 40 and projects outwardly from the cell wall. A nut 46 is screwed onto the threaded portion 42 of the pin 40 to compress the laminated wall 47 and collar 48 in the usual manner. A circumferential groove in the sleeve 44 is adapted to receive a rubber sealing ring 50. The ring 50 is compressed against the pin 40 and serves as a seal to prevent liquid contents of the container from flowing up the pin 40 and into contact with the cut edge 51 of the coated fabric wall. Should the liquid follow this course, it would saturate the fabric of the entire wall by "wicking action."

In this instance the cooperation between the flanges 43 and 45 to close against the insert ring 49 and compress the wall 47 is identical to the action described in conjunction with the construction illustrated in Fig. 1.

The fittings described in this specification are preferably made from metal, e. g. aluminum, stainless steel, steel, or other metal, depending upon the requirements for the particular application. The container walls may be made from any suitable fabric, e. g. cotton, rayon, nylon, which may be woven or in cord form. The coating used on the fabric depends, of course, upon the contents of the container. For fuels it is customary to use polychloroprene or copolymers of butadiene and acrylonitrile. For water, acids, and other corrosive chemicals natural rubber is preferred. Where bright colors and resistance to oxidation is desired the coating may be a polymer of vinyl chloride.

In the various embodiments of the present invention it is important that the size and shape of the clamping flanges of the fitting be such that they will exert a substantial clamping action on the marginal container wall lying between them, and also on the metal reinforcing ring embedded in the wall structure. If the fabric 15 is a rubber coated cord fabric it will be possible to distort such fabric and the reinforcing ring 19 to an elliptical shape so that the flange 12, for example, may be passed therethrough into the container, whereupon the ring 19 may be returned to its true circular shape and then held in this shape by the clamping pressure of the flanges 12 and 13.

While various detailed constructions have been described herein, it will be understood that changes may be made in the constructions without departing from the spirit of this invention or the scope of the claims.

Having thus described my invention what I claim and desire to protect by Letters Patent is:

1. In combination with a nonmetallic flexible-walled container having an opening therein, a ring of substantially round cross-section embedded in the surrounding wall and concentric with said opening, and a fitting attached to the surrounding wall in sealed relation, said fitting having an inner and outer flange clamped to the opposite faces of the surrounding wall, and said flanges being diametrically small enough to project into the space enclosed by said ring but large enough to exert some pressure on the ring.

2. In combination with a nonmetallic flexible-walled container having an opening therein, a metal ring of substantially round cross-section embedded in the surrounding wall and concentric with said opening, and a fitting attached to the surrounding wall in sealed relation, said fitting having an inner and outer flange clamped to the opposite faces of the surrounding wall, said flanges having an outside diameter approximately equal to the inside diameter of the ring and adapted to enter the ring sufficiently to exert a clamping pressure on said wall within the ring.

3. In combination with a nonmetallic flexible-walled container having an opening therein, a ring of substantially round cross-section embedded in the surrounding wall and concentric with said opening, and a fitting attached to the surrounding wall in sealed relation, said fitting having an inner and outer flange clamped to the opposite faces of the marginal wall, at least one of said flanges being diametrically small enough to project into the space enclosed by said ring to cooperate with the other flange to clamp therebetween the wall lying within the ring but large enough to exert some pressure on the ring to thereby prevent its being forced through the ring.

4. In combination with a nonmetallic container having a wall of plied sheet material and having an opening therein, a ring of approximately round cross-section embedded in the surrounding wall between the plies and concentric with said opening, and a fitting attached to the surrounding wall in sealing relation, said fitting having a shank and an inner and outer flange one of which is integral with the shank and the other is clamped thereto in gripping relation with the marginal wall, and said flanges having a diameter approximately equal to the inside diameter of the ring whereby they exert a clamping action on the ring and also on the portion of said wall within the ring.

5. In combination with a nonmetallic container having flexible walls made from plies of fabric coated with a plastic material subject to cold flow, an opening in said wall, a ring embedded between plies in the wall surrounding said opening and concentrically with said opening, a fitting comprising a shank portion extending axially through said opening and inner and outer flanges bearing on both the ring and the wall within the ring, to thereby clamp the wall and confine said plastic material within the space bounded by said shank, flanges, and ring.

6. In combination with a non-metallic flexible-walled container having an opening therein, a ring of substantially round cross-section embedded in the surrounding wall and concentric with said opening, and a fitting attached to the surrounding wall in sealed relation, said fitting having an inner and outer flange clamped to the opposite faces of the flexible wall inside the ring, at least one of said flanges having its outer edge beveled inwardly from a maximum diameter greater than the inside diameter of the ring to a minimum diameter slightly smaller than the inside diameter of the ring whereby the flange may exert pressure on both the ring and the portion of said wall within the ring.

MARION MORGAN CUNNINGHAM.

REFERENCES CITED

The following references are of record in the file of this patent:

UNITED STATES PATENTS

| Number | Name | Date |
| --- | --- | --- |
| 1,340,236 | Moehle | May 18, 1920 |
| 1,588,847 | McGee | June 15, 1926 |